United States Patent
Berghe

(10) Patent No.: US 10,168,751 B2
(45) Date of Patent: Jan. 1, 2019

(54) METHOD OF EXECUTING AN APPLICATION ON A DISTRIBUTED COMPUTER SYSTEM, A RESOURCE MANAGER AND A DISTRIBUTED COMPUTER SYSTEM

(71) Applicant: FUJITSU LIMITED, Kawasaki-shi, Kanagawa (JP)

(72) Inventor: Sven van den Berghe, Marlow Bucks (GB)

(73) Assignee: FUJITSU LIMITED, Kawasaki (JP)

( * ) Notice: Subject to any disclaimer, the term of this patent is extended or adjusted under 35 U.S.C. 154(b) by 282 days.

(21) Appl. No.: 14/688,457

(22) Filed: Apr. 16, 2015

(65) Prior Publication Data

US 2015/0378406 A1    Dec. 31, 2015

(30) Foreign Application Priority Data

Jun. 27, 2014   (EP) .................................... 14174838

(51) Int. Cl.
*G06F 1/26*    (2006.01)
*G06F 1/32*    (2006.01)
(Continued)

(52) U.S. Cl.
CPC .............. *G06F 1/26* (2013.01); *G06F 1/3228* (2013.01); *G06F 9/5094* (2013.01);
(Continued)

(58) Field of Classification Search
CPC ...... G06F 1/26; G06F 9/5094; G06F 11/3006; G06F 1/3228
See application file for complete search history.

(56) References Cited

U.S. PATENT DOCUMENTS 8,214,662 B2   7/2012   Nishioka
8,495,393 B2   7/2013   Oh et al.
(Continued)

FOREIGN PATENT DOCUMENTS

CN   103268261   8/2013
JP   2010-146546  7/2010
(Continued)

OTHER PUBLICATIONS

OpenMP Application Program Interface, version 3.1, published Jul. 2011, accessed at http://www.openmp.org/wp-content/uploads/OpenMP3.1.pdf [hereinafter OpenMP Application Program Interface].*

(Continued)

*Primary Examiner* — Kim Huynh
*Assistant Examiner* — Kevin M Stewart
(74) *Attorney, Agent, or Firm* — Staas & Halsey LLP

(57) ABSTRACT

A Resource Manager is provided for managing a plurality of computers. Each of the computers is operable in one of a plurality of power configurations, including a high-power configuration and low-power configurations. The Manager exchanges messages with a Manager Proxy in each computer. Responsive to notifications from Manager Proxies of changes in execution state of an application, the Manager determines a power configuration applicable for the computer of that Manager Proxy, or for a set of computers executing the application. The Manager indicates the power configuration to the Manager Proxy which then decides whether to implement a change.

14 Claims, 7 Drawing Sheets

(51) Int. Cl.
*G06F 11/30* (2006.01)
*G06F 9/50* (2006.01)

(52) U.S. Cl.
CPC ........ *G06F 11/302* (2013.01); *G06F 11/3003* (2013.01); *G06F 11/3006* (2013.01); *G06F 11/3055* (2013.01); *G06F 11/3058* (2013.01); G06F 2201/865 (2013.01); Y02D 10/22 (2018.01)

(56) References Cited

U.S. PATENT DOCUMENTS

| | | | |
|---|---|---|---|
| 9,104,435 | B2 | 8/2015 | Potkonjak |
| 2005/0125701 | A1 | 6/2005 | Hensbergen et al. |
| 2009/0100437 | A1 | 4/2009 | Coskun et al. |
| 2009/0106571 | A1 | 4/2009 | Low et al. |
| 2009/0144566 | A1* | 6/2009 | Bletsch ................. G06F 1/3203 713/300 |
| 2010/0205306 | A1 | 8/2010 | Kayanuma et al. |
| 2010/0262779 | A1* | 10/2010 | Potkonjak ............. G06F 8/4432 711/118 |
| 2012/0195355 | A1* | 8/2012 | El-Essawy .............. H04B 3/54 375/222 |
| 2012/0216205 | A1 | 8/2012 | Bell, Jr. et al. |
| 2013/0139170 | A1 | 5/2013 | Prabhakar et al. |
| 2013/0191436 | A1* | 7/2013 | Chintalapati ......... G06F 9/5072 709/201 |
| 2014/0189399 | A1* | 7/2014 | Govindaraju ........... G06F 1/324 713/323 |
| 2014/0281181 | A1* | 9/2014 | Fromm ................. G06F 3/0653 711/104 |
| 2015/0026336 | A1* | 1/2015 | Suchter ................ G06F 9/5038 709/224 |
| 2015/0058641 | A1* | 2/2015 | Parikh ................. H04L 67/1002 713/300 |
| 2015/0067356 | A1* | 3/2015 | Trichy Ravi ............ G06F 1/324 713/300 |
| 2015/0355699 | A1* | 12/2015 | Castro-Leon ............. G06F 1/30 713/322 |

FOREIGN PATENT DOCUMENTS

| | | |
|---|---|---|
| JP | 2010-186255 | 8/2010 |
| JP | 2010-257445 | 10/2010 |
| WO | 2008/129786 A1 | 10/2008 |

OTHER PUBLICATIONS

Extended European Search Report dated Dec. 4, 2014 in corresponding European Patent Application No. 14174838.4.
Ioannou et al., "Phase-Based Application-Driven Hierarchical Power Management on the Single-chip Cloud Computer", International Conference on Parallel Architectures and Compilation Techniques, IEEE Computer Society, 2011, pp. 131-142.
Elnozahy et al., "Energy-Efficient Server Clusters", Low-Power Computing Research Center, IBM Research, Austin, TX, XP-002623104, 18 Pages.
"Cluster Computing: Resource and Job Management for HPC", SC-Camp, Aug. 16, 2010, pp. 1-49.
"Argo: An exascale operating system", Mathematics and Computer Science, Tools and Technology for Solving Critical Scientific Problems, 3 pages.
Li et al., "The Thrifty Barrier: Energy-Aware Synchronization in Shared-Memory Multiprocessors", 10 pages.
Radenac et al., "Resource Management Systems for Distributed High Performance Computing", ANR Cosinus Coop, Deliverable D2.2, Version 1.1, Feb. 4, 2011, 26 Pages.
Office Action issued in corresponding Japanese 2015-110603 dated Oct. 2, 2018.

* cited by examiner

-Prior Art-

METHOD OF EXECUTING AN APPLICATION ON A DISTRIBUTED COMPUTER SYSTEM, A RESOURCE MANAGER AND A DISTRIBUTED COMPUTER SYSTEM

CROSS REFERENCE TO RELATED APPLICATIONS

This application claims the benefit of European Application No. 14174898.4, filed Jun. 27, 2014, the disclosure of which is incorporated herein by reference.

FIELD OF THE INVENTION

The present application relates to energy-aware resource management in a distributed computer system, such as a high-performance computer system (HPC system).

BACKGROUND OF THE INVENTION

The invention addresses energy consumption in computer systems, for example the amount of energy consumed by programs running on large-scale computer clusters, particularly high performance computing (HPC) systems. HPC clusters consist of a large number of quasi-independent computers (nodes) that are coupled together and may be used to execute one large, monolithic application. Applications (or other jobs) are split into a number of communicating tasks; a Resource Manager allocates these tasks to computers and can also manage the power configuration of the computer hardware to reduce the energy consumed.

The Resource Manager is responsible for the efficient running of the HPC system, making sure that resources, including nodes and any other resources, deliver a service to requirements. The over-riding service requirement is generally to complete the application as fast as possible but, since the nodes may be high-end computers and use a lot of energy, a secondary requirement, whose importance is rising, is to use as little energy as possible. The compute nodes have a variety of mechanisms that can be used to reduce the energy consumption, but these usually come at the cost of computational performance. Thus, each node will in general have a plurality of possible operating modes or "power configurations" which differ in their respective performance and energy usage.

The programs executed in High Performance Computing (HPC) have a number of features that distinguish HPC from other forms of large-scale computing, such as web-scale computing. One of these is that a HPC program can be thought of as one computation distributed across a large number of separate computers (in contrast, web-scale programs are, essentially, a large number of independent computations executed simultaneously on the separate computers). As any computation proceeds through the program phases or stages, the demands on the resources that it uses change. In other words, the demands on the hardware vary according to the current "state" of the application, by which is meant not only the stage of completion of the application but also the type of operation demanded at that time. Typically, execution of a program proceeds through initialization and iteration phases, repeating the same sections of code many times in the same execution, the resource demands being similar or identical at each repetition.

In web-scale computing, as the computations execute essentially independently, the changes in resource demand also occur independently with an averaging effect that results in the resource use pattern over the whole set of computers becoming fairly static. HPC programs, on the other hand, will show coordinated patterns of resource use change as the program changes to the same state simultaneously across all the occupied computers.

These differing patterns of resource use change impact the best design of Resource Managers. For web-scale programs, resource management decisions can be made local to the computers. However, for HPC-style programs resource management must occur at the global level in addition to local-level management.

Increases in the capability of the microprocessors that form the core of the computers result in increased energy use. However, modern microprocessor designs also have the ability to reduce power consumption when the highest performance is not required. This is achieved through a variety of techniques, such as voltage and frequency scaling or turning off unused sections of a microprocessor. The energy reduction decisions are made implemented locally in each computer, responding to the observed conditions of the code currently operating on the computer. Different computers may be in different energy and performance configurations (power configurations).

Performance and energy management therefore happens at two levels in HPC systems: across a program spanning multiple computers and locally to each computer. These management decisions operate at different timescales. Local management is fast, responding to short time changes. Global management time scales are longer as they are determined by the time that it takes to communicate information from the individual computers to the centralized Resource Manager program, by the time taken to process the gathered data to make a management decision, and by the time taken to distribute that decision to the computers.

Changing power configurations takes time, and poor coordination of power configuration changes across computers can have adverse effects on the performance of a HPC program so it is often the case that local power management is turned off or operated very conservatively, ensuring acceptable performance but missing many opportunities for energy savings. On the other hand, centralized management will not be distributed quickly enough to exploit all energy saving opportunities.

When distributing an HPC application over the nodes, each portion of the application is decoupled as much as possible from the other portions, although some communication between the nodes is always necessary. Communication leads to the nodes having to coordinate their execution as they wait for the arrival of messages from other nodes. The degree of coordination varies with application and algorithm type, but there are usually many times during an application's execution where nodes will wait for the completion of computations on other nodes. A number of these waits for coordination require global communications (i.e. across all nodes allocated to the application) and so any delays to the execution by one node will cause the whole application to wait for the slowest node to catch up—referred to as a global coordination barrier or simply "global barrier".

To illustrate this, FIG. 1 shows execution phases of a simple program executing on four nodes A to D, with time represented by the length along the horizontal bars. The program has four phases, execute, wait, execute and wait. The wait dependencies are shown as arrows between the nodes. The first wait phase models a local coordination barrier since the nodes only communicate in pairs that is, A with B and C with D. The second wait models a global barrier; every node waits on all the other nodes before completion. This is labeled "Global Wait" in the Figure to indicate that all nodes (in general) must wait here. A node which is in the waiting phase may be said to have "entered" the barrier at a certain timing represented by the start of the wait phase.

As there are imbalances in the loads and run times over the computers, individual computers will reach the barrier at different times with the result that some computers will wait at the global barrier for other computers to catch up. As the waiting computers are not calculating, they can be placed into a low energy power configuration, with no effect on performance, until all computers are at the global barrier. However, late arrivals at the global barrier should remain in a high power/fast performance power configuration, since the time taken to achieve the configuration changes will slow the program's performance. This decision cannot be made locally as each computer does not know where it is in the arrival queue; therefore the decision must be made centrally, but as fast as possible to save as much energy as possible.

The time scales at the centralized management area (Resource Manager) are much longer than the local time scales. This is due to the time taken to receive enough messages to make effective decisions and time to process the messages, more particularly the time taken to execute optimization algorithms scaling with computer count and the time to access parts of data structures. As the number of computers in a cluster scales to 100,000 to 1,000,000, the time taken for any central management will become longer too.

The problem to solve is to make and distribute central decisions fast enough with large numbers of participating computers to exploit short-lived opportunities for energy savings during a computation.

Many Resource Managers expose the ability to set the energy saving mode of a job to the user of the HPC cluster. This capability is not well used since the users are not motivated to save energy (by, for example, being charged for energy used in addition to other resources used). Also, the users will not want to reduce the execution performance of their applications (i.e. they want to minimize the time to solution). Therefore, Resource Managers need to automatically apply energy saving modes where it can be guaranteed that performance will not be affected.

Similarly, the local operating systems have the ability to directly set the power configuration of their underlying hardware. This ability present in the hardware is exposed on most operating systems present on HPC clusters. Use of this capability is generally limited, i.e. it is usually turned off, since the locally determined changes to execution rate have unpredictable effects on the computation rate of a distributed application, which can accumulate across the computers to yield large overall delays in execution.

The state of the art in "energy-aware" Resource Managers is represented by US patent applications US 20120216205 and US 20090100437. These describe a Resource Manager with a database of the performance characteristics of previously submitted jobs and a computational model of the effect of placing a cluster into energy saving mode on a job with the given performance characteristics. If the Resource Manager can identify a job as being the same as one previously submitted, it uses the recorded characteristics to compute the best energy configuration that does not impact performance.

A problem not addressed in the prior art is that the optimal configuration for energy efficiency changes during an application's execution, often with high frequency. Setting a single configuration for the duration of an application is always a compromise, losing some performance and not achieving highest energy efficiency.

It has been proposed to distribute responsibility for management through a hierarchy of resource managers (e.g. CN103268261 and Argo, http://www.mcs.anl.gov/project/argo-exascale-operating-system). Distributing the computation and data collection load amongst a number of smaller components reduces the individual computation burden and so increases responsiveness. However, as each of the sub-managers only receives data from a limited subset of computers, it cannot ensure the optimal behavior of the whole system.

Therefore, it is desirable to provide energy-aware management of a distributed computer system which avoids the above problems.

SUMMARY OF THE INVENTION

According to an embodiment of one aspect of the invention there is provided a method of executing an application on a distributed computer system, the distributed computer system including a Resource Manager and a plurality of computers to which the application is allocated and each operable in one of a plurality of power configurations, the method comprising:

providing a Resource Manager Proxy in each computer of the distributed computer system;

each Resource Manager Proxy notifying the Resource Manager of a change in execution state of the application in the computer in which said Resource Manager Proxy is provided;

the Resource Manager, in response to the notifying, determining a power configuration for at least one said computer;

the Resource Manager informing the power configuration to the Resource Manager Proxy of said at least one computer; and the Resource Manager Proxy causing a change of power configuration of the computer based on the informing.

Although Resource Managers as such are known in the art, the Resource Manager Proxy is newly-provided in the present invention. The Resource Manager Proxy is a kind of local agent for the Resource Manager, in each computer. The Resource Manager Proxy need not implement the power configuration directly but may for example communicate with the computer's own OS to effect the change.

The Resource Manager Proxy monitors code being executed by its own computer, in order to detect changes in execution state. Preferably, the notifying further comprises the Resource Manager Proxy identifying messages, generated from annotations in code of the application allocated to the computer, indicative of the execution state (or changes thereof).

The Resource Manager informs the Resource Manager Proxy of the power configuration, for example, by making a recommendation of a new power configuration for the computer to use. In response, the Resource Manager Proxy may decide whether or not to change the power configuration of the computer by taking account of an existing power configuration of the computer. Thus, for example, if the power configuration recommended in the informing step is the same as the current configuration, no change is necessary.

The Resource Manager Proxy may confirm a change of power configuration of the computer, by sending a message to the Resource Manager. Alternatively, the Resource Manager Proxy may inform the Resource Manager if the recommended power configuration is not implemented for any reason.

Preferably the power configurations include at least one high-power and at least one low power configuration, and the determining further comprises the Resource Manager identifying that a plurality of the computers have entered a wait state, and determining a low-power configuration for those computers.

Here, the wait state may be a "global wait" (due to a global barrier) affecting all the computers to which the application is allocated. Alternatively it could be a "local wait" affecting some of the computers but not others.

In either case, the method may further comprise:

the Resource Manager monitoring which of the computers have entered the wait state;

the Resource Manager determining a transition time at which to prepare computers to leave the wait state;

the Resource Manager, prior to the transition time, informing a notifying Resource Manager Proxy of a low-power configuration; and after the transition time, recommending a high-power configuration to the Resource Manager Proxy of each computer which has entered the wait state.

The "transition time" here may depend on how many computers have already entered the wait state (or in other words, reached the barrier), and/or the time elapsed since the first computer to reach the barrier began waiting.

In any case, the method may further comprise, in the determining and informing steps, the Resource Manager first determining and informing a provisional recommendation of power configuration for at least one computer and subsequently updating the recommendation and informing the Resource Manager Proxy of the updated power configuration.

In some instances, the power configuration determined by the Resource Manager will apply to all the computers, in which case the above mentioned notifying step comprises broadcasting the power configuration to all the Resource Manager Proxies.

Furthermore, the Resource Manager may pre-emptively broadcast a power configuration to all the Resource Manager Proxies before the notifying step. In other words the Resource Manager need not wait to receive reports from the Resource Manager Proxies prior to providing a recommendation for a power configuration.

Preferably, the Resource Manager is provided by at least one computer separate from the computers to which the application is allocated.

The Resource Manager may be provided in distributed form with a plurality of Resource Managers each responsible for a respective subset of the computers to which the application is allocated and connected by a communications framework.

According to a second aspect of the present invention, there is provided a Resource Manager for managing a plurality of computers in a distributed computer system to execute an application, each of the computers operable in one of a plurality of power configurations, the Resource Manager comprising:

a communications module for exchanging messages with a Resource Manager Proxy in each computer of the distributed computer system;

a state monitor responsive to notifications from Resource Manager Proxies of changes in execution state of the application, to determine a state of at least one said computer; and a power configurer responsive to the state determined by the state monitor to determine a power configuration for at least one said computer;

the communications module arranged to inform the determined power configuration to the Resource Manager Proxy of said at least one computer.

A third aspect of the present invention provides a high-performance computer system comprising a plurality of computers each equipped with a Resource Manager Proxy as defined above and a Resource Manager as described above.

According to a further aspect of the present invention, there is provided software comprising computer-readable code which, when executed by a computer of a distributed computer system, provides a Resource Manager Proxy comprising:

a code reader for reading indications, contained in program code allocated to the computer, of a change in execution state of the program code;

a communications module for forwarding the indications to a Resource Manager of the distributed computer system and receiving, from the Resource Manager, a power configuration recommendation for the computer;

a power manager for causing a change of power configuration of the computer based on the recommendation from the Resource Manager.

It should be emphasized here that the "computer" is not only acting as the Resource Manager Proxy but also executes part of the application, namely the above mentioned "program code allocated to the computer".

A still further aspect relates to software for providing the above mentioned Resource Manager.

Such software may be stored on one or more non-transitive computer-readable recording media.

Thus, embodiments of the present invention provide a novel architecture for energy aware HPC resource managers. The design minimizes loads on computational nodes, while guaranteeing fast enough responses to enable exploitation of short-lived states that can be exploited to save energy. The Resource Manager is preferably provided by a computer which is not itself one of the computational nodes. An alternative implementation is as a group of communicating resource manager peers, distributing load for responsiveness with corrections through background and back-channel communications.

Embodiments may reduce the amount of energy used in, particularly, but not exclusively, high performance computing systems by enabling fine grained, responsive control of the power configuration of the individual computers in a HPC cluster taking into account the overall state of an application occupying multiple computers. Such fine-grained control is not available in current systems due to an unresolved tension between knowledge of the global program state and fast local state changes, with the result that many energy saving opportunities are missed.

In this specification, a "power configuration" refers to one or more settings of a computer in a distributed computer system which implies both a certain performance level and a certain energy usage level. The "state" of a program, with respect to a given computer, refers to the part of the application code currently being executed by the computer under consideration, and the kind of operations (such as "compute", "wait" or "move data") instructed by that part of the code. The terms "node", "server", and "computer" are used interchangeably unless the context demands otherwise. Likewise, the terms "system" and "cluster" are equivalent. The terms "application", "program" and "job" are also interchangeable unless the context demands otherwise.

BRIEF DESCRIPTION OF THE DRAWINGS

Reference is made, by way of example only, to the accompanying drawings in which.

DETAILED DESCRIPTION

Embodiments of the present invention will now be described with reference to FIGS. 2 to 9.

Figure 1:
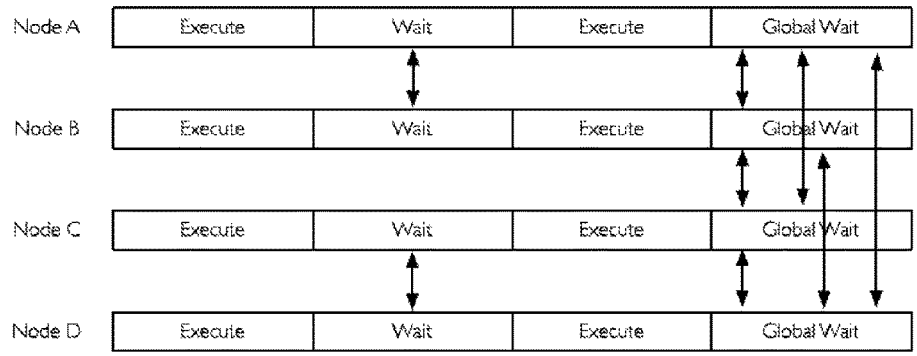
FIG. 1 shows an execution timeline of an application apportioned among a plurality of nodes.
Figure 2:
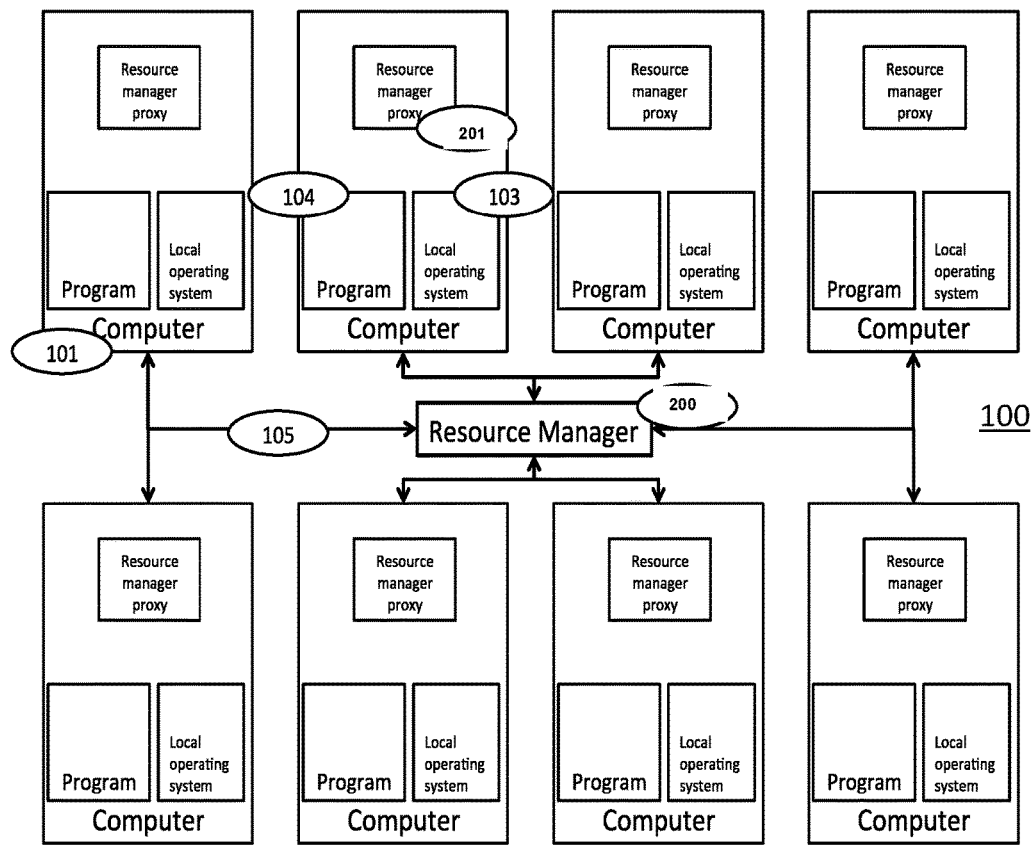
FIG. 2 shows a computer system (HPC cluster) to which an embodiment of the present invention is applied.

FIG. 2 shows a distributed computer system 100 in one embodiment of the invention. A Resource Manager 200 controls the power configuration of a large number of computers 101 in a HPC cluster 100. The computers 101 constitute computational nodes (or "compute nodes") of an HPC program. Although FIG. 2 shows eight computers, high-end HPC clusters will run HPC programs that use resources from many thousands to hundreds of thousands of computers. Each of the computers is assumed to be operable in any one of a plurality of power configurations, including a highest-power, higher-performance configuration and one or more energy-saving, reduced performance modes.

Each computer runs three programs that are relevant to this invention; these programs are independent of each other. The programs are a Resource Manager Proxy 201, the local Operating System 103 and the local part of the HPC application 104.

In this embodiment, the Resource Manager 200 is executed on another computer that is part of the HPC cluster 100, but does not execute any portion of the application that it is managing. Thus, although the resource manager itself is a computer program that uses computer resources, separate resources are provided for this purpose to avoid interfering with the execution of the HPC program and slowing down the performance of the overall HPC application.

The Resource Manager Proxy 201 is a very lightweight program (in other words, very low in resource usage of its host computer) that represents the Resource Manager 200 on each local computer 101. That is, the Resource Manager Proxy is a local manager which assists the centralized Resource Manager. There is one Resource Manager Proxy per computer 101 taking part in the execution of the application. Its light weight means that interference with the local part of the HPC application will be small. The Resource Manager Proxy 201 is new in the present invention and methods are proposed whereby it can be kept lightweight.

The local Operating System is the interface to manage the power configuration of the computer hardware.

The local HPC program 104 is the part of the HPC application that executes on the computer. Note that the control flow of the local HPC program executes independently of the flow of all the other local HPC programs. Coordination of the HPC application is achieved through message passing between the local HPC programs.

The invention proposes an additional pattern of message passing; in FIG. 2, these messages pass between the Resource Manager and each computer, for example as indicated at 105.

Figure 3:
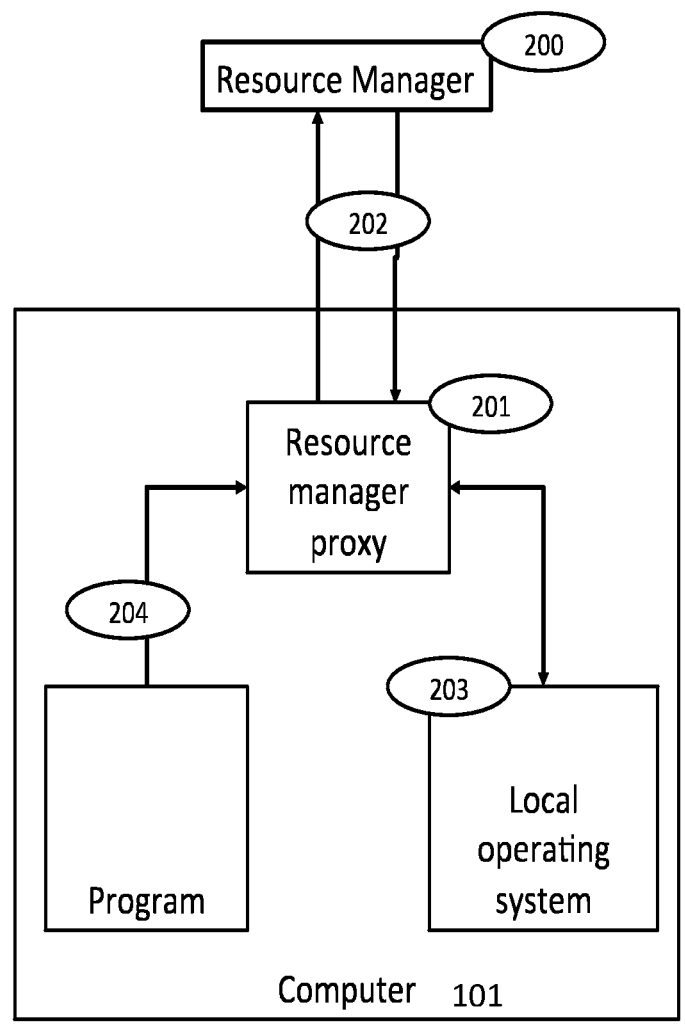
FIG. 3 shows functional blocks within one computer of the FIG. 2 system.

FIG. 3 shows a single computer from FIG. 2 in more detail. The same structure is applied to every computer that is executing part of the HPC application. All communication with the Resource Manager 200 is through the Resource Manager Proxy 201; this communication is bi-directional as indicated at 202. The Resource Manager Proxy sends the Resource Manager information about changes to the local HPC program's state (see below) and receives suggestions from the Resource Manager for the best power configuration of the hardware (given the state of the local HPC program and the state of the overall HPC application). The Resource Manager Proxy interacts with the Local Operating System 203 to set the power configuration. Communication between the local HPC program and the Resource Manager proxy is one way—as shown by 204, the local HPC program sends only—and for example comprises short messages indicating a state change.

HPC programs using this invention are required to be able to report their state to their local Resource Manager Proxy, using function calls which are added to the HPC program for reporting purposes. These calls should indicate entry to and exit from sections of code that have characteristics that can be exploited for energy savings.

Examples of such code sections include:

Compute intensive sections, that should run at the maximum speed possible

Wait sections, for example waiting for communications to complete or a barrier to be reached where it may be possible to run at reduced power consumption Local data movement sections (e.g. transferring data to disk) where it may be possible to run at reduced power consumption It will be apparent that each of the above kinds of section corresponds to a different program "state". The resource demands on a computer which currently is executing a compute-intensive section of code will be much greater than in a wait section for example, so these different states can be distinguished for the purpose of setting the power configuration of the computer.

These sections will require suitable mark up in the HPC application code, following the pattern of, say, the OpenMP API for shared memory multiprocessing programming. The purpose of this is to annotate the program code to identify distinct code parts corresponding to different program states such as execute, communicate, wait, etc. In the current state of programming technology, the mark-up would normally need to be performed by a human programmer, although an automated technique might also be possible. An example of such annotated code follows, where the statements starting "#pragma amee" are those intended as messages for the Resource Manager:

```
#pragma amee neighbour_communicate
    std::vector<MPI_Request> reqs; MPI_Request r;
    /* Do all my sends and receives */
    if (rank+1<size) {
        MPI_Isend(...;
        MPI_Irecv(...;
```

```
        }
        if (rank-1>=0) {
            MPI_Isend(...
            MPI_Irecv(...;
        }
#pragma amee global_wait
        MPI_Waitall(...
#pragma amee computing
#pragma omp parallel for private(i)
        for (j=1;j<ht-1;j++) { // this is MPI level
            for (i=1;i<wid-1;i++) {
                dest(i,j) = physics(src,i,j);
                ...
            }
        }
        std::swap(src,dest);
```

Here, the annotations (notifications) intended for the Resource Manager Proxy are converted in a similar way to communication calls, using conventional techniques for analysing annotations and converting them to calls at compile time. Thus, the Resource Manager Proxy may receive a notification each time the program execution in the relevant computer reaches one of the statements exemplified above.

It should be noted that in the architecture of FIGS. 2 and 3 the communication is local to the computer. This means that it is possible to exploit lightweight and fast communication methods supplied by the local operating system (for example, standard Unix Interprocess Communication (IPC) techniques such as message queues or shared memory segments) rather than the across cluster communication used for messaging within the HPC application.

Figure 4:
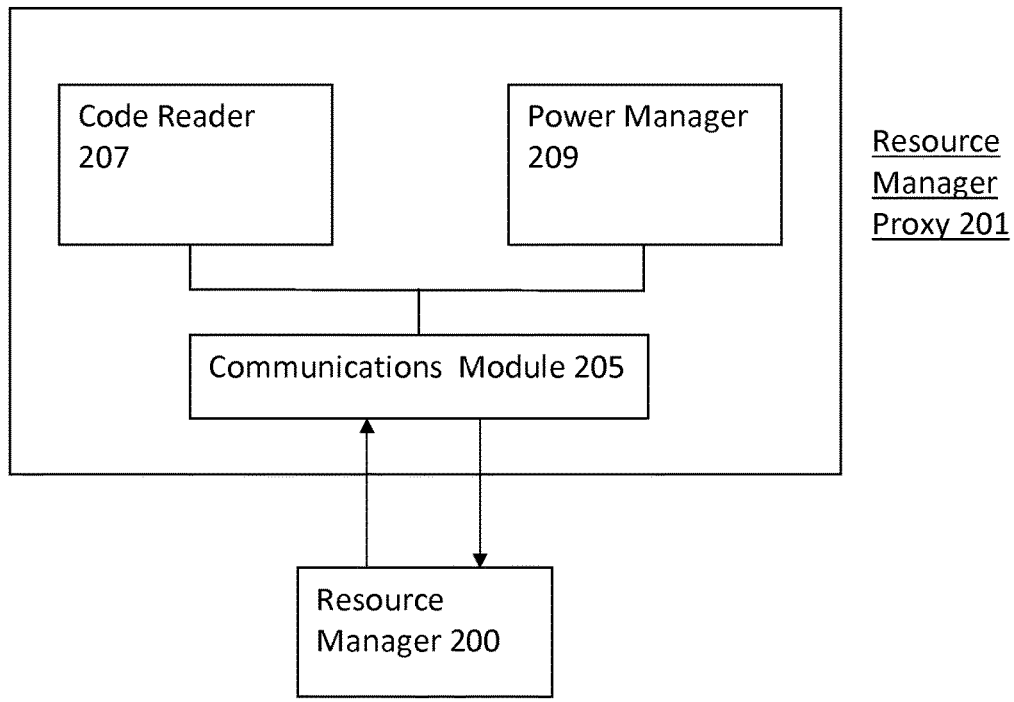
FIG. 4 shows functional modules of a Resource Manager Proxy of the FIG. 2 system.

FIG. 4 illustrates functional modules of a Resource Manager Proxy, including a code reader 207 for receiving the statements mentioned above which are indicative of a change in execution state of the application in the computer; a communications module 205 for notifying a Resource Manager 200 of the distributed computer system of the change in execution state and receiving, from the Resource Manager, a power configuration recommendation; and a power manager 209 for initiating a change of power configuration of the computer 101 based on the recommendation from the Resource Manager.

The Resource Manager Proxy 201 is a lightweight program, as it executes on the same computer as the local HPC program and should not compete for resource with that. The code reader 207 detects the above mentioned annotations as messages embedded in the program code, which indicate changes in the section of code currently being executed and thus, the execution state. The code reader may be programmed to react to messages generated as the result of such annotations, for example the above mentioned "#pragma amee" annotations, without having to decode or understand those messages. The communications module 205 relays these messages from the HPC program to the Resource Manager. Messages from the communications module will contain, in addition to the information content or "payload", an identification of the originating computer. The payload itself may simply reproduce the above mentioned message generated from the annotation, or may provide it in some processed form. The communications module 205 also receives from the Resource Manager a request or recommendation for a power configuration change. Then, the power manager 209 implements the power change (if appropriate) by sending an instruction to the local operating system 203, which can be assumed to be ultimately responsible for power management of the computer. In this case (for example, the interaction between Resource Manager 200 and communications module 205), communication is across the computers in the HPC cluster. However, HPC clusters have efficient communications networks and standardised APIs to access them and so the Resource Manager Proxy to Resource Manager communication can use these: an example is the Message Passing Interface API.

The Resource Manager Proxy 201 needs little intelligence, being mostly concerned with receiving and sending messages and implementing power configuration changes; however, it may perform some simple processing. For example, even though, as described below, the Resource Manager will attempt to respond quickly, it may be that the local program state has changed before the Resource Manager request is received. The Resource Manager Proxy may choose to ignore the requested power configuration if the current local HPC program state is incompatible with the requested power configuration.

Figure 5:
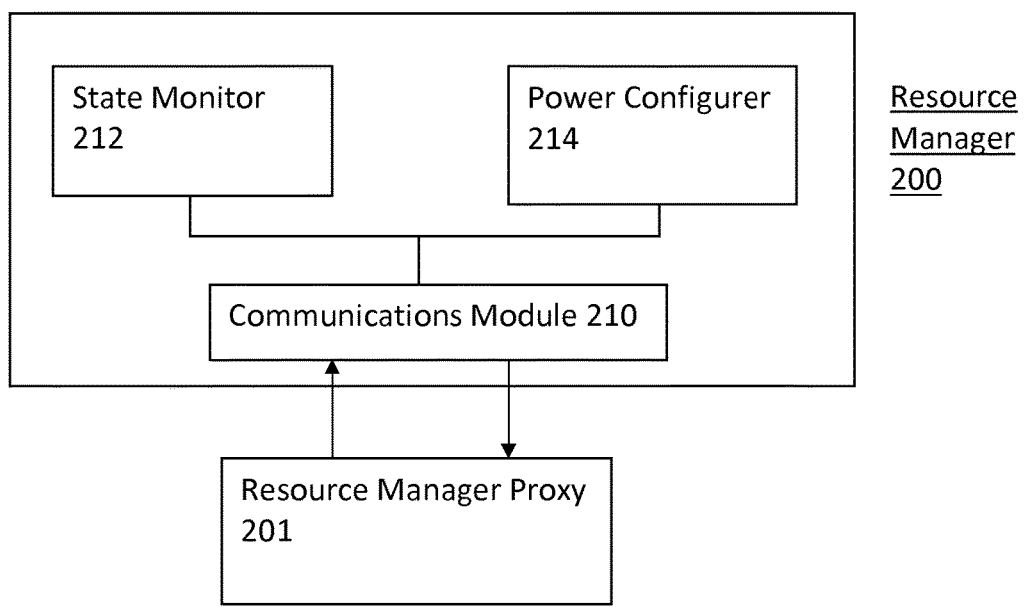
FIG. 5 shows functional modules of a Resource Manager of the FIG. 2 system.

FIG. 5 illustrates functional modules of a Resource Manager 200 which are of relevance to the present invention (it is not excluded that other functional modules are present, such as a scheduler for initially apportioning program code to each computer; however, this is outside the scope of the invention).

In the Resource Manager 200, a communications module 210 receives messages from all the computers allocated to the application, via the respective Resource Manager Proxies. For the purposes of the present explanation, the only communication between the Resource Manager 200 and computers 101 is via the Resource Manager Proxies 201. However, it would be possible for the Resource Manager to receive inputs from other sources too, since the Resource Manager will generally manage other aspects of the HPC system in addition to the computers 101. For example, the Resource Manager may receive information on entry to and exit from library functions.

A state monitor 212 monitors these messages to assess the overall state of the HPC program and to detect opportunities for energy savings. The state monitor is aware of all the computers involved in the HPC cluster and can distinguish incoming messages based on the identifier of the originating computer. Based on the overall state as monitored by the state monitor 212, a power configurer 214 exploits an opportunity for saving energy by switching one or more of the computers to an energy-saving mode, and sends a message to the communications module 210 to instruct the Resource Manager Proxies accordingly. A message intended for a specific computer (as opposed to a broadcast message—see below) will include an identification of the destination computer, allowing the message to be routed over the message passing infrastructure. The communications module may receive a return message from the Resource Manager Proxies, such as a confirmation that the recommended power configuration has been adopted (or alternatively that it has been ignored—see above).

A variety of processing techniques can be used to detect these opportunities, including looking up a database of heuristic actions for the type of code being executed, and using data from previous iterations to estimate the likely program evolution and so compute the optimal strategy (by pattern matching, generic algorithms etc.). However, the number of messages and consequent processing required to derive a power configuration means that it may take a long time to compute the optimal new power configuration for the reporting computer. Preferably, therefore, the power configurer 214 makes a provisional recommendation based on incomplete processing of the information i.e. a power configuration that may be wrong or sub optimal. In parallel with this recommendation being communicated via the communications module 210, the power configurer 214 will compute the optimal power configuration and, at some point in the future may update its recommendation.

Before considering how to identify energy-saving opportunities, it may be observed that HPC applications generally have the following properties.
(i) Applications are distributed over a large number of nodes which can be controlled (at least with respect to power settings) individually.
(ii) The nodes execute their respective portions of the application independently, but all non-trivial applications require communication between nodes and so have points where progress is dependent on partner nodes reaching a mutual coordination point (a barrier).
(iii) Applications typically consist of a number of initialisation and iteration phases, each initialisation phase being followed by an iteration phase. The initialisation phases may be relatively short in comparison with the total execution time.
(iv) The rate of progress through a computation can vary from node to node, due for example, to imbalances in the load on a node, interference from other code executing on the node and differing node capabilities. This results in some nodes waiting for other nodes at barriers.

Thus, one energy-saving opportunity arises where nodes are waiting at a global barrier. A typical HPC application can be expected to have a plurality of similar global barriers owing to the repetition of iterative phases mentioned earlier. Computers reaching this barrier earliest will be instructed to move to a low power configuration, but at some point when almost all of the computers have reached the barrier, the optimal strategy is to leave the late arrivals in a high power configuration and to start to move the others to the high power configuration. The Resource Manager learns the optimal transition time (time elapsed from the first entry of any computer into the barrier) to do this changeover by watching many instances of the barrier within the same execution of the HPC program, which requires a lot of processing and so uses possibly out of date information.

Figure 6:
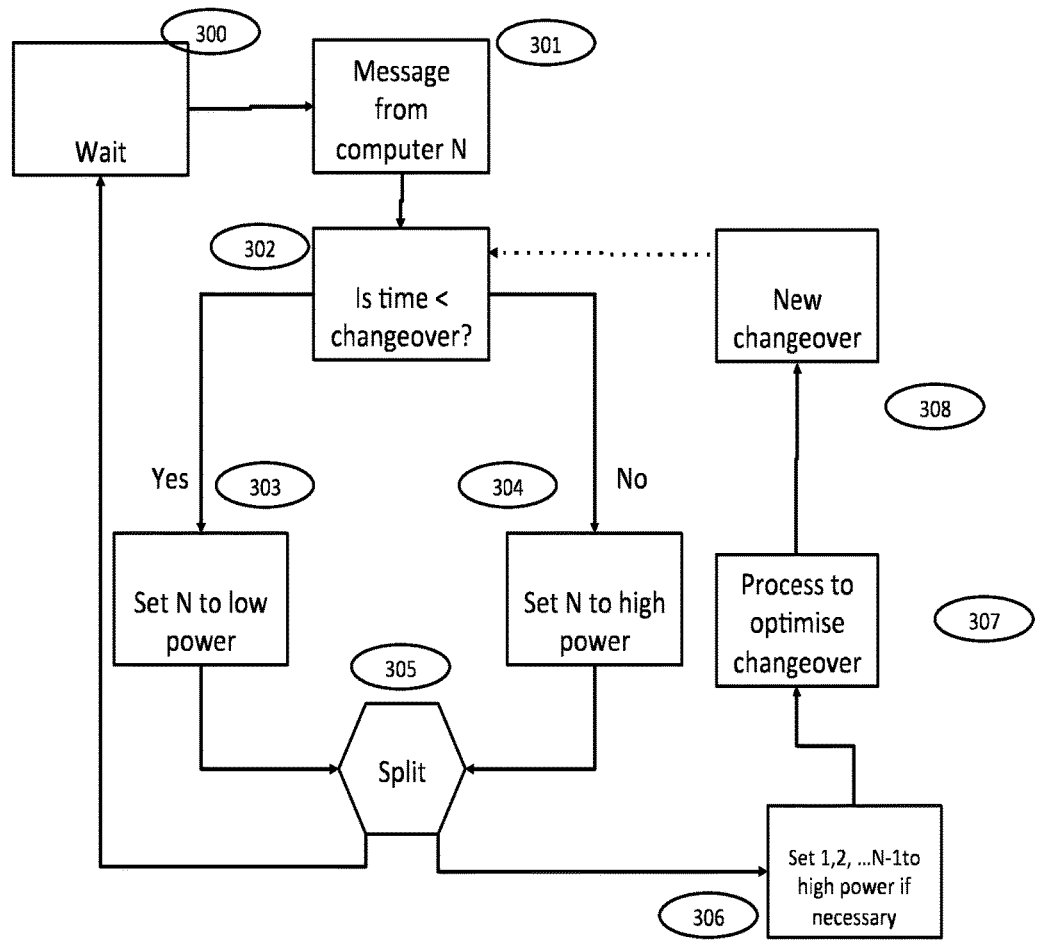
FIG. 6 shows the process flow in a Resource Manager, in one method embodying the present invention.

FIG. 6 shows the flow of logic for the above case in the Resource Manager. The Resource Manager keeps a record of each computer's state, i.e. the stage of execution which it has reached. The Resource Manager waits for messages at step 300, and processing starts at 301 when a message is received from a Resource Manager Proxy. The Resource Manager identifies the computer from which the message was received as the Nth computer to have reached the global barrier, and updates the recorded state for that computer. At step 302, the Resource Manager determines that the transition time has been reached in which to perform the changeover referred to above. Such determination can be based on the number N (that is, the count of how many computers have reached the barrier), the time elapsed at the barrier, or preferably both. The Resource Manager immediately checks the state of arrivals at this barrier and sets a reply to the Nth computer with the recommended power configuration (steps 302, 303, 304).

Processing then splits at step 305 into two concurrent threads. A first thread is a high-priority waiting for new messages, with the flow returning to step 300. A second thread involves, low priority further (background) processing of the message, which firstly may change the power configurations of previously reporting computers if necessary (step 306). A change to power configurations of previously reporting computers 1 to N−1 will be necessary if the current power state of those computers is different from the current recommendation as determined in step 307. The second thread further involves processing to update and optimise the Resource Manager's responses for this barrier in step 307, which may result (step 308) in setting a new value for the transition time from recommending low to recommending high power configurations at 305. This new value of the transition time would be applied to future instances of the same (or corresponding) barrier during the program execution.

The technical focus of this invention is to distribute optimal configurations that take account of the global situation to local computers fast enough so that they can act on them to save energy. The discussion above considered point to point "duplex" communications. However, once a change of recommended configuration has been made, it often applies to all the computers taking part in the computation. This means that it is optimal to reset previous configurations (e.g. step 306). It also means that it would be optimal to send this current recommended configuration to all computers to allow a configuration change to be applied locally before a communications step from proxy to Resource Manager, thus speeding up the response to a change of power configuration.

Figure 7:
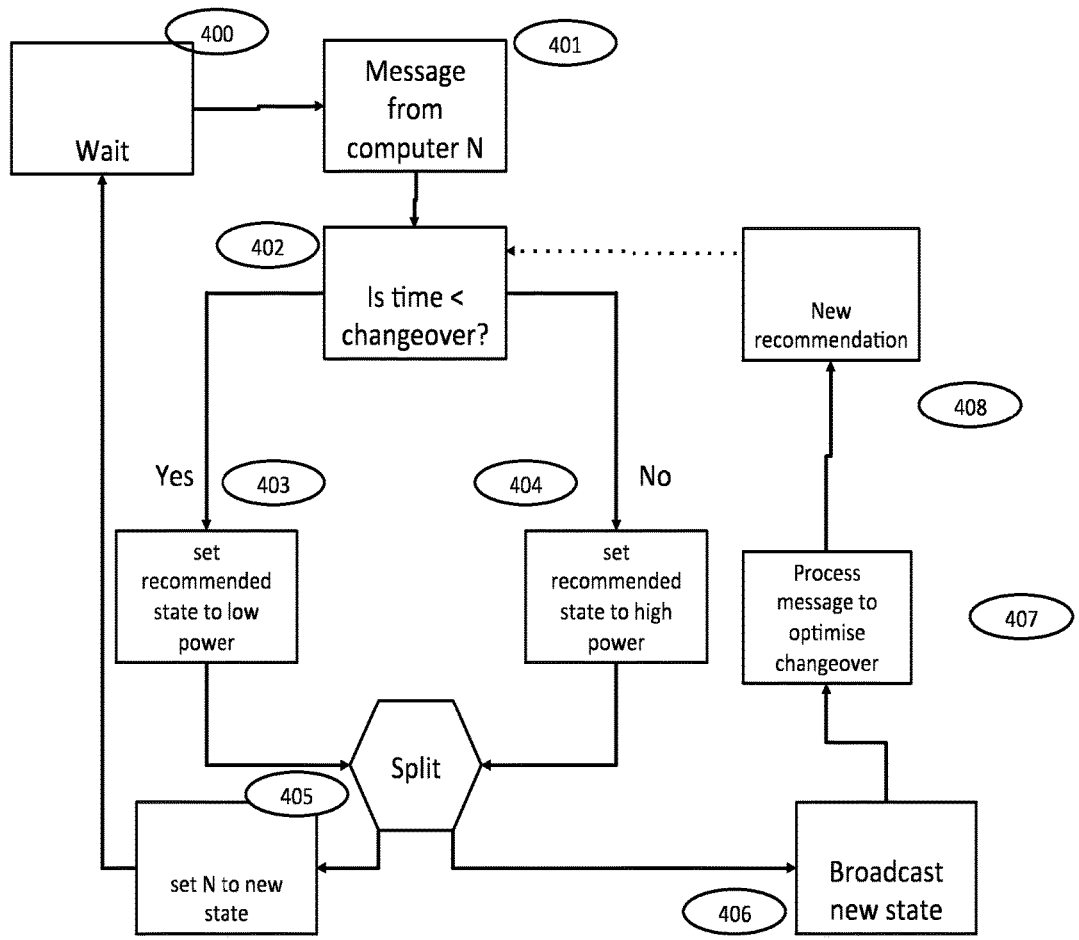
FIG. 7 shows a modified version of the process flow in FIG. 6.

FIG. 7 shows this variant protocol, which now include a pre-emptive and post-emptive broadcast of recommended configurations, where a "broadcast" refers to a message sent to all Resource Manager Proxies, not only to one Resource Manager Proxy as discussed previously. A broadcast message would be received by a Resource Manager Proxy in the same way as a targeted, point-to-point message, but the Resource Manager Proxies would need to be prepared to receive such broadcasts at any time, not only when awaiting a response from a report to the Resource Manager.

In an initial step 400, the Resource Manager waits for incoming messages from computers. In step 401, a message arrives from the Nth computer to reach the subject state. The message is processed in high priority to determine the optimal configuration for this Nth computer (steps 402, 403, 404). Processing splits into a high priority thread that sets the optimal configuration of the Nth computer and then waits for further incoming messages. If there is a change in the recommended configuration for the subject state (stage of execution), the low priority thread broadcasts this change to all participating computers (see step 406, namely to those computers that have already reported that they are in the subject state and those that are yet to report). The Resource Manager then performs the processing in steps 407 and 408 to update the view of the global application state. It will be noted that steps 405 and 406 will not necessarily always occur, step 405 only being required if the Nth computer does not already know (through a broadcast message) the recommended power configuration, and step 406 only being necessary if the recommended power configuration changes.

Figure 8:
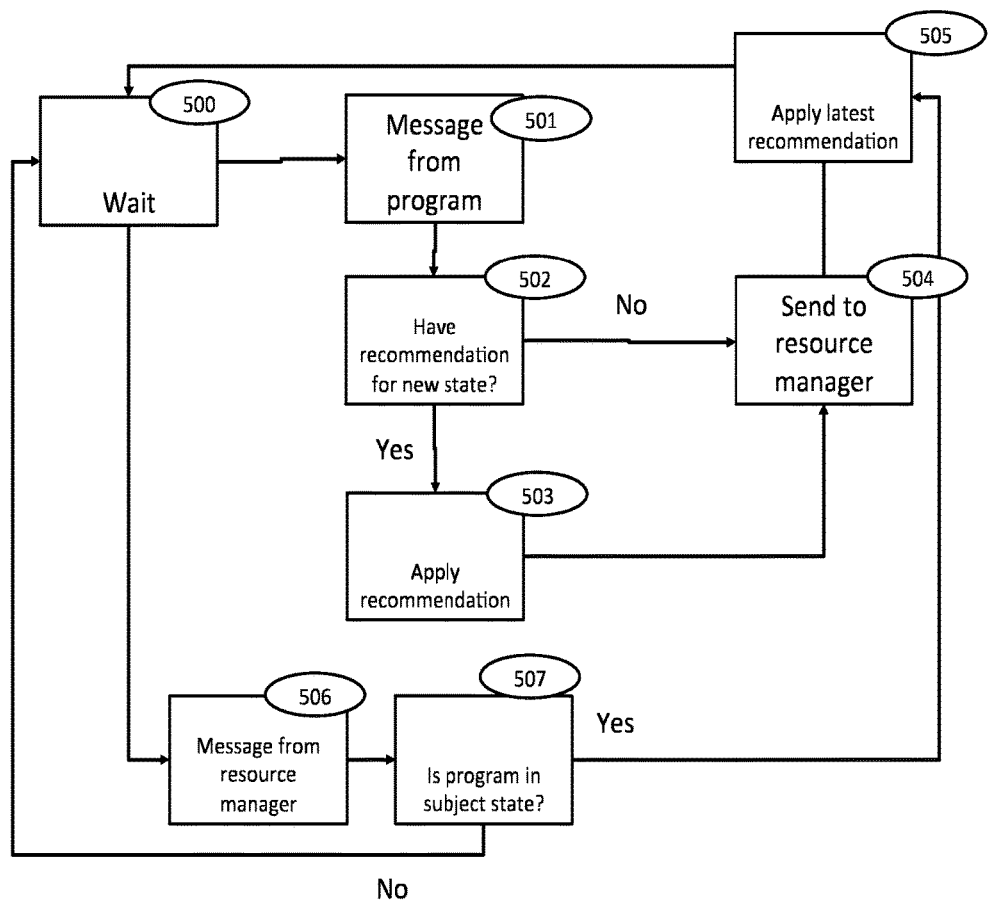
FIG. 8 shows a process flow within a Resource Manager Proxy.

FIG. 8 shows the control flow within a Resource Manager Proxy 201. At first, in step 500, the proxy waits for messages from either its local program (part of the HPC application) or from the Resource Manager. At step 501, a message from the local program indicates a local change of program state. In step 502, the proxy may already have received a recommendation for this state as part of the broadcast step 406. If so, in step 503 it applies that configuration to the local hardware. Once the recommendation has been applied, step 504 relays a message to the Resource Manager. The Resource Manager response recommendation may change from that held by the proxy, if so the new configuration is applied to the local hardware in step 505; the response recommendation is also applied here for the case where it is a new recommendation. The Resource Manager Proxy then returns to the wait state (step 500).

In step 506, a message from the Resource Manager may apply to any of the possible program states. The proxy records the recommendation and if it applies to the current program state (step 507, Yes) applies it to the hardware in step 505, otherwise it returns to the wait state.

The messages passed between the Resource Manager and the Resource Manager Proxy need to uniquely identify the point in the code where the state change occurs. As already mentioned, HPC code is commonly iterative, repeating code sections frequently with different data, this means that the messages also need to identify which pass through the code applies. So the payload of a message passed either way, or broadcast, will contain at least two values: the code part identifier and the pass identifier. A code part may be defined as the section of the program between two of the annotations referred to earlier, or equivalently, the annotations themselves can form labels for the code parts.

A further embodiment of this invention replaces the single Resource Manager with a group of Resource Managers, each Resource Manager being responsible for a subset of the computers allocated to the application. The relationship between the Resource Managers is flat, all Resource Managers are peers and there is no hierarchy. Protocols and interactions between the Resource Managers and their proxies remain as described above, but there is additional communication between the component Resource Managers as they negotiate a global view of the application.

Resource Managers need to share information to obtain a view of the best actions to take when there are global operations in the application. For example, in optimising a global wait, all the Resource Managers should be aware of the total time that the application spends in a wait state, i.e. the length of time between the first computer entering the wait state, and the last exiting it. Since HPC applications are iterative with regular patterns, a decision based on previous iterations will be fairly accurate. This means that distributed Resource Managers control their client computers with optimisations determined from data from previous iterations. In the background they can update their optimisations, ready for the next iteration of the particular state change. This can be done by background interactions between the Resource Managers.

Figure 9:
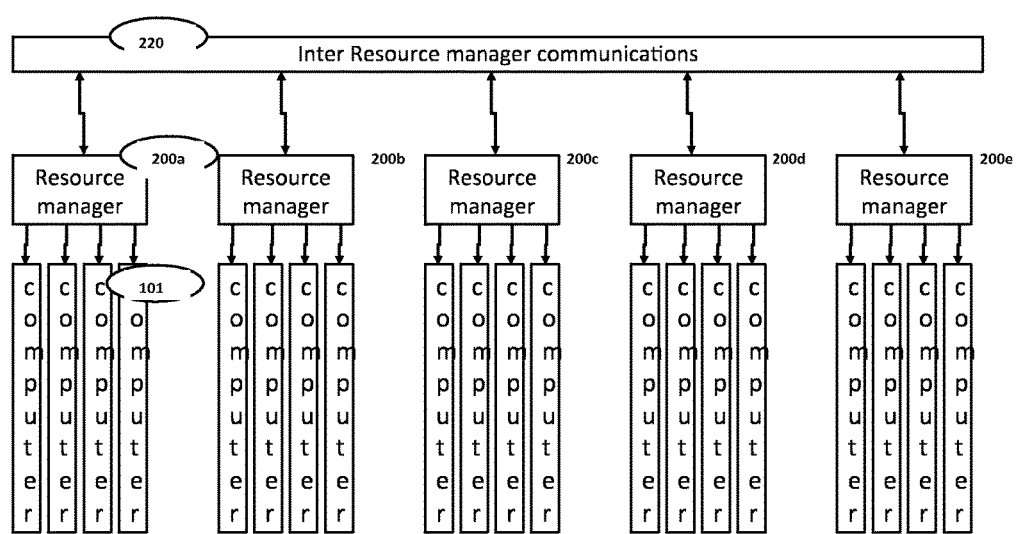
FIG. 9 shows another embodiment, in which the Resource Manager is distributed.

FIG. 9 shows this embodiment. The computers 101 are the same as those in FIG. 2 with the same internal arrangements. They communicate to Resource Managers in the same manner, i.e. via their Resource Manager Proxy. Now there is more than one instance 200*a*, 200*b*, . . . 200*e* of a Resource Manager and there is an intra-Resource Manager communications framework 220, which may simply be a software construct on top of the communications hardware which already exists, similar to the communications between the Resource Manager(s) and Resource Manager Proxies.

Distributed Resource Managers will have difficulty maintaining an accurate global count of computers in a particular state, so the technique used above of counting instances will be unsuitable. Instead the Resource Managers will need to make decisions based in the time spent in the target state. When the first computer allocated to a given Resource Manager enters a new state (such as reaching or leaving an instance of a global barrier), that Resource Manager broadcasts the fact to all other Resource Managers, and this can be used to create a global start time. Message traffic is reduced by otherwise transmitting consolidated reports of activity at regular intervals.

The advantage of this distributed peer-to-peer Resource Manager architecture arises from the distribution of load. Each Resource Manager deals with a proportion of the overall load, making the computation and the message processing burden lower—thus the Resource Managers can be more responsive. Additionally, the load on the communications network is reduced as there is no concentration of messages to and from all computers to a single processor.

The proportion of computers allocated to a Resource Manager can be decided in many ways. One way is to distribute the computers evenly to the Resource Managers, so that each Resource Manager deals with the same number of computers. It is also possible to distribute the computers to Resource Managers according to messaging load so that, on average each Resource Manager handles an equal number of messages.

To summaries the above, embodiments of the present invention provide a technique to actively manage an application to exploit very short-term opportunities for energy efficiency throughout execution. In a distributed computer system, a Resource Manager 200 is provided for managing a plurality of computers 101 to execute an application. Each of the computers is operable in one of a plurality of power configurations, including a high-power configuration and one or more low-power configurations. The Resource Manager 200 exchanges messages with a Resource Manager Proxy 201 in each computer of the distributed computer system. The application is annotated to report to the Resource Manager Proxy entry and exit to sections of code that affect energy use (code annotations for other purposes, such as exposing parallelism, are standard practice, but application to energy efficiency is new). The Resource Manager Proxy passes on these reports to the Resource Manager.

Responsive to notifications from Resource Manager Proxies of changes in execution state of the application, the Resource Manager determines a power configuration applicable for the computer of that Resource Manager Proxy, or for a set of computers (including possibly all the computers) executing the application. The Resource Manager 200 informs the determined power configuration to the Resource Manager Proxy 201 which then decides whether to implement a change. This reduces the amount of energy used in, particularly, but not exclusively, high performance computing systems by enabling fine grained, responsive control of the power configuration of the individual computers in a HPC cluster taking into account the overall state of an application occupying multiple computers.

The configurations sent to computers by the resource manager may be out of date (the emphasis is on replying quickly and correcting errors later). The Resource Manager can pre-emptively broadcast configurations, in addition to sending recommendations in response to the messages from the Resource Manager Proxies. The Resource Manager may be in a distributed form.

Various modifications are possible within the scope of the invention.

Although described in detail for the example of a global wait in which all computers enter a global barrier, the present invention can be applied also to local barriers involving only a subset of the computers in the distributed computer system. The present invention can also be applied to other state changes in execution of a program having an effect on resource demands, such as exiting a global or local barrier, entering or exiting a communications (IO) section of code, entering or exiting a compute section of code.

Another example would be to regularise the execution speed across the nodes executing an application. The Resource Manager can use the reports from the Proxies to determine which nodes are running faster than other nodes (from the timing of the reports of the end of a computation phase, or from their average time spent waiting for other nodes in local waits) and slow the faster nodes to save energy, with the intention that the formerly faster nodes execute at similar speed to the slower nodes.

Alternatively, depending on the ratio of slow to fast nodes, the slow nodes could be placed into a higher power/execution rate mode so that the overall computation speeds up and the whole system uses less energy.

There are other bulk changes to program state that can be exploited in the same way as the global wait such as a large scale communications step where all the nodes send data to all the other nodes or a phase where all the nodes are writing data to disk.

Reference was made above to a plurality of power configurations of the computers. Although there may be many such configurations, at a minimum, only two are needed: a normal power configuration for computation and a low-power configuration.

It was assumed above that only the Resource Manager Proxy, under instruction from the Resource Manager, can change the power configuration of a computer. However, it would be possible to operate the computer's local power management system in conjunction with the Resource Manager Proxy, for example with a strategy of allowing local independence to switch to a high-power mode, whilst enforcing a decision by the Resource Manager to switch to a low-power mode.

The method steps referred to herein may be carried out in a different order from the order of definition and still produce favourable results.

The Resource Manager may be implemented in software, hardware, middleware, as an application specific integrated circuit (ASIC) or in any other form. The Resource Manager Proxy will normally be implemented in software.

INDUSTRIAL APPLICABILITY

This invention allows the discovery and implementation of the most efficient configuration of the hardware for a particular application, one that achieves unchanged performance with the lowest power consumption, whilst the application is executing, thereby reducing energy consumption in high-performance computing without necessarily prolonging execution time.

The invention claimed is:

1. A method of executing a single monolithic application on a high-performance computer system, the computer system including a Resource Manager and a plurality of computers coupled together to execute the application and each operable in one of a plurality of power configurations, the method comprising:
    allocating a respective portion of the application to each of the computers, each portion including code sections comprising executable code and corresponding to different application states including a compute-intensive state, a data transfer state, and a wait state for coordination with other computers;
    providing a Resource Manager Proxy in each computer of the high-performance computer system;
    notifying, by the Resource Manager Proxies, the Resource Manager of changes of application states in the computers, wherein the notifying further comprises the Resource Manager Proxy identifying messages, generated from annotations in the code sections of the portion of the application allocated to the computer, the annotations added as mark up for reporting purposes to the executable code and indicative or the application state;
    accessing, by the Resource Manager an overall state of the application in response to the notifying and, based on an overall state, determining a power configuration for an individual computer of the high-performance computer system;
    informing, by the Resource Manager, the determined power configuration to the Resource Manager Proxy of the computer; and
    causing, by the Resource Manager Proxy, a change of power configuration of the computer based on the informing.

2. The method according to claim 1, further comprising the Resource Manager Proxy deciding whether to change the power configuration of the computer using an existing power configuration of the computer.

3. The method according to claim 1, further comprising the Resource Manager Proxy confirming the change of power configuration of the computer to the Resource Manager.

4. The method according to claim 1, wherein the power configurations include at least one high-power and at least one low power configuration, and the determining further comprises the Resource Manager identifying that the application state in a plurality of the computers has entered a wait state, and determining for the computers in the wait state the low-power configuration.

5. The method according to claim 4, wherein the wait state is a global wait affecting all the computers to which portions of the application are allocated.

6. The method according to claim 4, further comprising:
    the Resource Manager monitoring in which of the computers the application state has entered the wait state;
    the Resource Manager, based on said monitoring, determining a transition time at which to change over computers from the low-power to the high-power configuration;
    the Resource Manager, prior to the transition time, informing a notifying Resource Manager Proxy of the low-power configuration; and
    after the transition time, informing the Resource Manager Proxy of each computer of which the application state has entered the wait state of the high-power configuration.

7. The method according to claim 1, further comprising, in the determining and informing steps, the Resource Manager first determining and providing a provisional recommendation of power configuration for at least one computer and subsequently updating the recommendation and informing the Resource Manager Proxy of an updated power configuration.

8. The method according to claim 1, wherein the power configuration determined by the Resource Manager applies to all the computers, and the notifying comprising broadcasting the power configuration to all the Resource Manager Proxies.

9. The method according to claim 1, further comprising the Resource Manager broadcasting a power configuration to all the Resource Manager Proxies before said notifying.

10. The method according to claim 1, wherein the Resource Manager is provided by at least one computer separate from the computers to which portions of the application are allocated.

11. The method according to claim 1, wherein the Resource Manager is in a distributed form comprising a plurality of Resource Managers each responsible for a respective subset of the computers to which portions of the application are allocated and connected by a communications framework.

12. A Resource Manager for managing a plurality of computers in a high-performance computer system, the computers being coupled together to execute a single monolithic application, each of the computers being allocated a respective portion of the application including code sections comprising executable code and corresponding to different application states including a compute-intensive state, a data transfer state, and a wait state for coordination with other computers, and each of the computers operable in one of a plurality of power configurations, the Resource Manager comprising:
- a communications module for exchanging messages with a Resource Manager Proxy in each computer of the high-performance computer system;
- a state monitor responsive to notifications from Resource Manager Proxies to determine changes of application states in the computers and assess an overall state of the application, the notifications generated by the Resource Manager Proxies from annotations in the code sections of the portion of the application allocated to the computer, the annotations added as mark up for reporting purposes to the executable code and indicative of the application state; and
- a power configurer responsive to an assessment by the state monitor to determine a power configuration for an individual computer of the high-performance computer system;

wherein the communications module being arranged to inform the power configuration to the Resource Manager Proxy of the computer.

13. A non-transitory computer-readable recording media storing computer-readable code which, when executed by a high-performance computer system, performs the method according to any of claim 1.

14. A high-performance computing system, comprising:
the Resource Manager according to claim 12; and
a plurality of computers coupled together to execute a single monolithic application, each of the computers being allocated a respective portion of the application including code sections comprising executable code and corresponding to different application states including a compute-intensive state, a data transfer state, and a wait state, and each of the computers operable in one of a plurality of power configurations,
wherein each of the computers is equipped with the Resource Manager Proxy for notifying the Resource Manager of changes of application states in the computers, the Resource Manager Proxy comprising:
a code reader for identifying messages, generated from annotations in the code sections of the portion of the application allocated to the computer, the annotations added as mark up for reporting purposes to the executable code and indicative of the application state;
a communications module for forwarding the messages to the Resource Manager and receiving, from the Resource Manager, a power configuration recommendation for the computer;
a power manager for causing a change of computer power configuration based on the recommendation from the Resource Manager.

\* \* \* \* \*